United States Patent [19]

Courtney

[11] Patent Number: 5,127,752
[45] Date of Patent: Jul. 7, 1992

[54] DEVICE AND METHOD OF REGISTERING IMAGE RELATIVE TO BORDER OF PRINTED MEDIA

[75] Inventor: Thomas P. Courtney, Santa Clara, Calif.

[73] Assignee: Apple Computer, Inc., Cupertino, Calif.

[21] Appl. No.: 639,827

[22] Filed: Jan. 9, 1991

[51] Int. Cl.⁵ .............................................. B41J 21/02
[52] U.S. Cl. ................................ 400/342; 400/279; 400/705.1; 400/708
[58] Field of Search ............... 400/139, 279, 579, 582, 400/630, 342, 344, 708, 705, 706, 662, 705.1

[56] References Cited

U.S. PATENT DOCUMENTS 3,814,227 6/1974 Hurd et al. ........................ 101/93
4,272,204 6/1981 Quinn et al. ...................... 400/342
4,394,693 7/1983 Shirley .............................. 358/298
5,074,690 12/1991 Del Signore et al. ............. 400/279

FOREIGN PATENT DOCUMENTS 0161183 8/1985 Japan ................................. 400/708
0228977 10/1988 Japan ................................. 400/342

Primary Examiner—Edgar S. Burr
Assistant Examiner—Ren Yan
Attorney, Agent, or Firm—Blakely, Sokoloff, Taylor & Zafman

[57] ABSTRACT

The subject invention comprises a printer system for a serial printer having an optical sensor detection system for the alignment of images on a sheet of print media, the correction of misalignment as a result of inaccurate alignment of the print media and the determination of the orientation of print media in a printer.

9 Claims, 5 Drawing Sheets

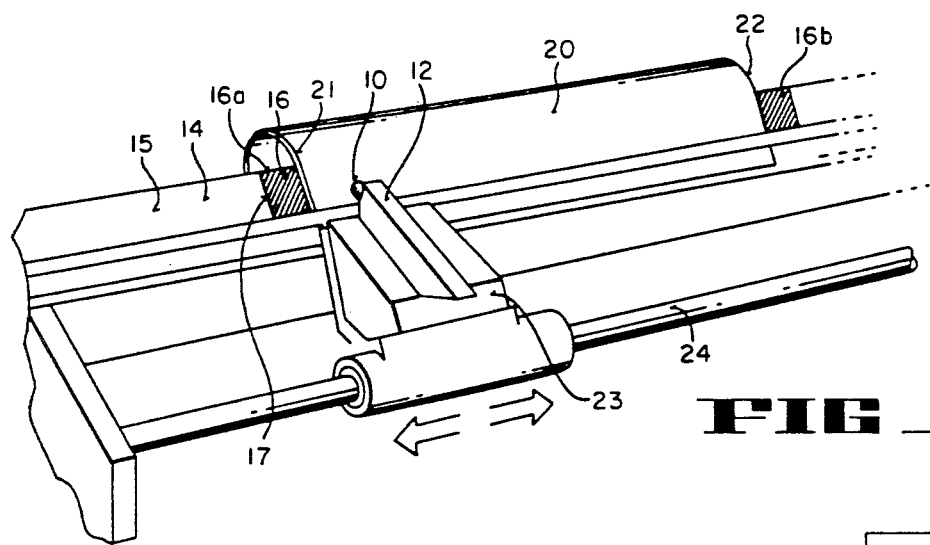
FIG_1
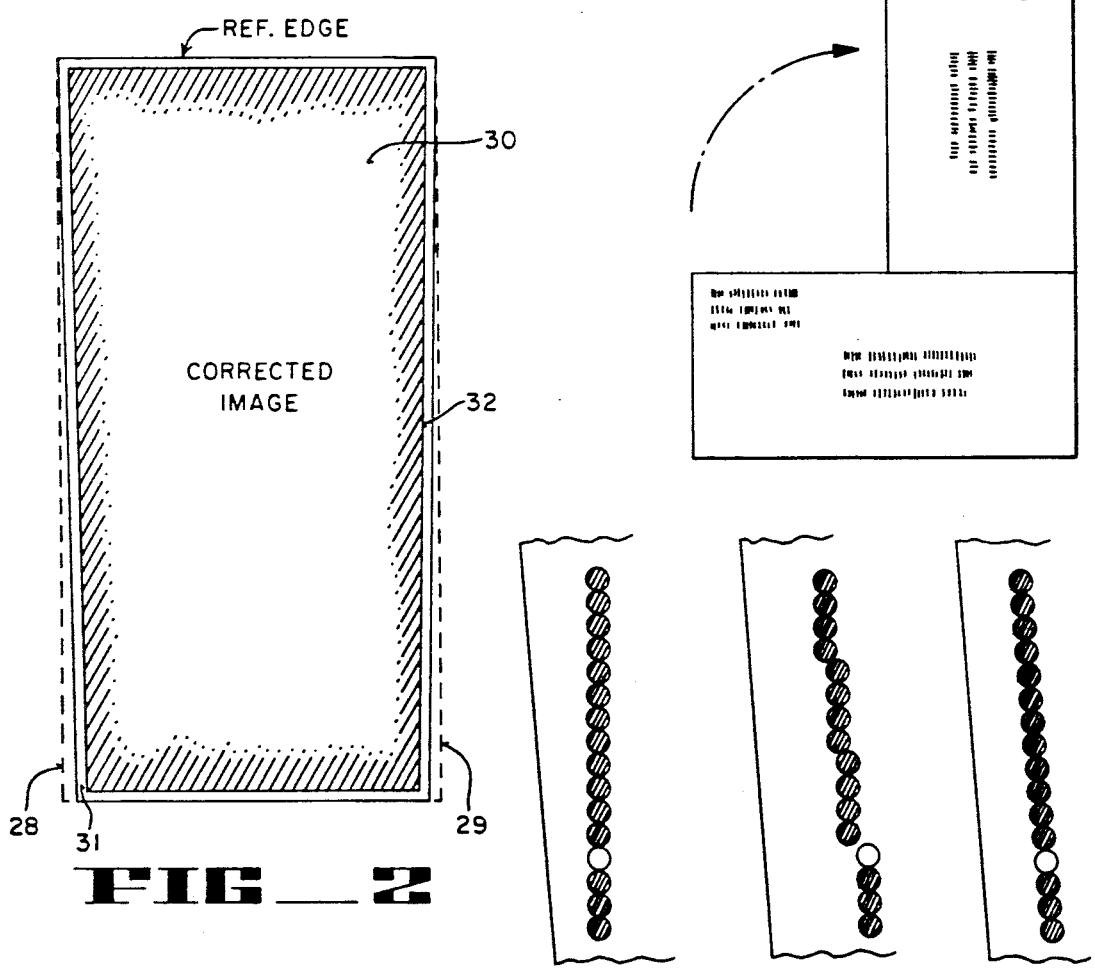
FIG_3
FIG_2
FIG 4A  FIG 4B  FIG 4C

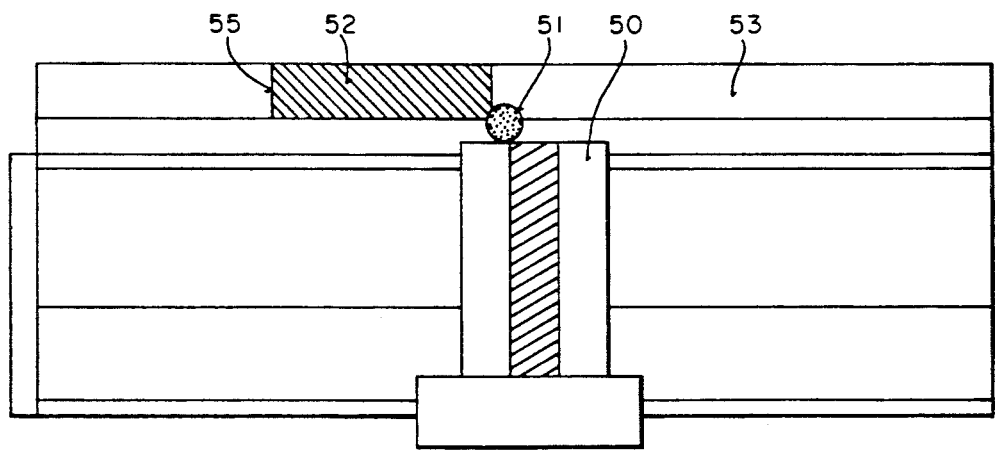
FIG_5
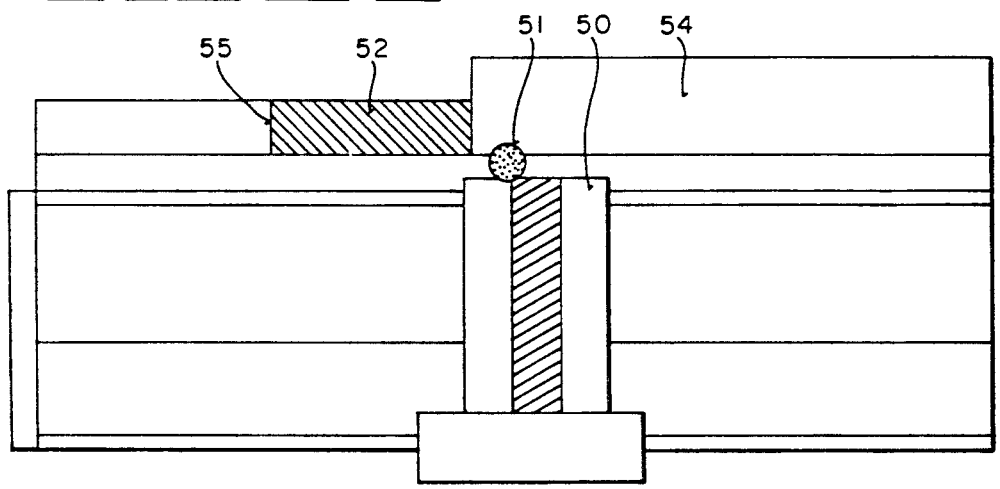
FIG_6
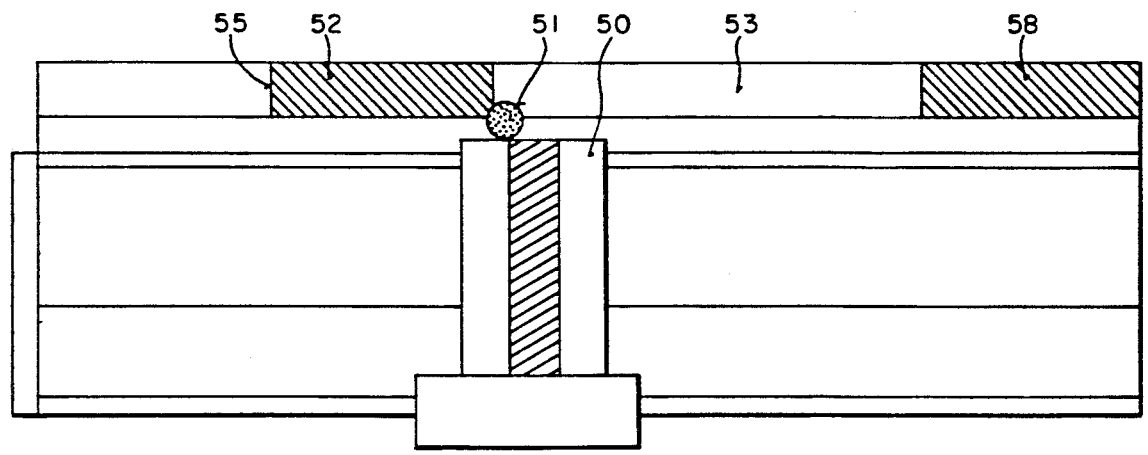
FIG_7

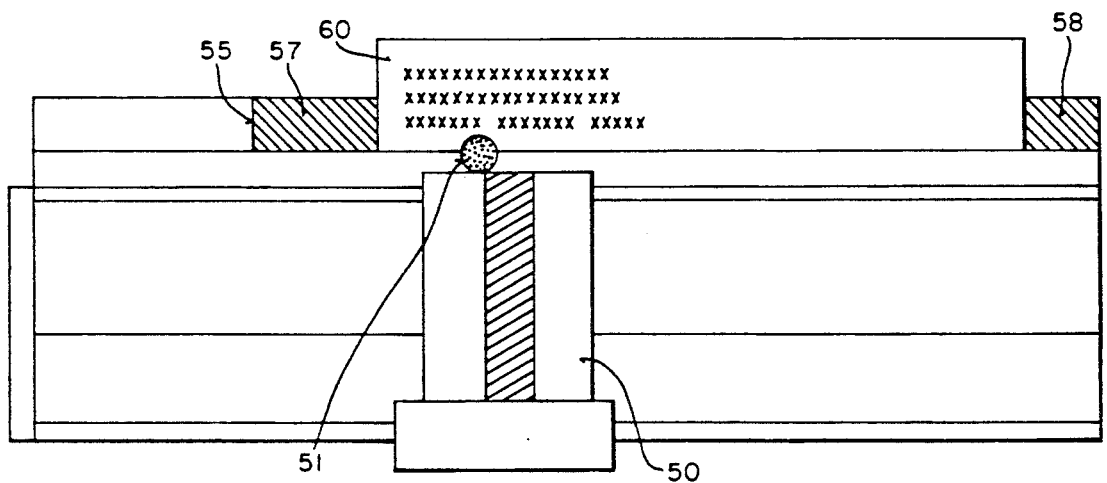
FIG_8
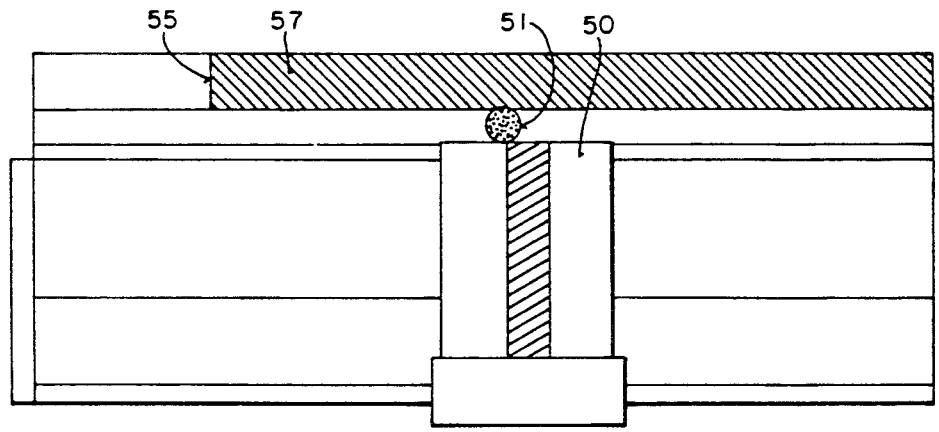
FIG_9
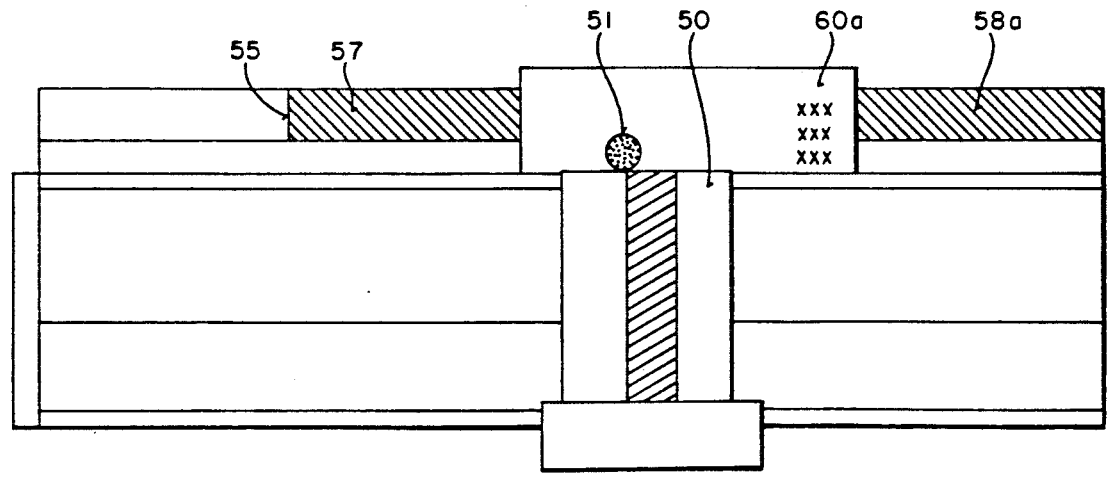
FIG_10

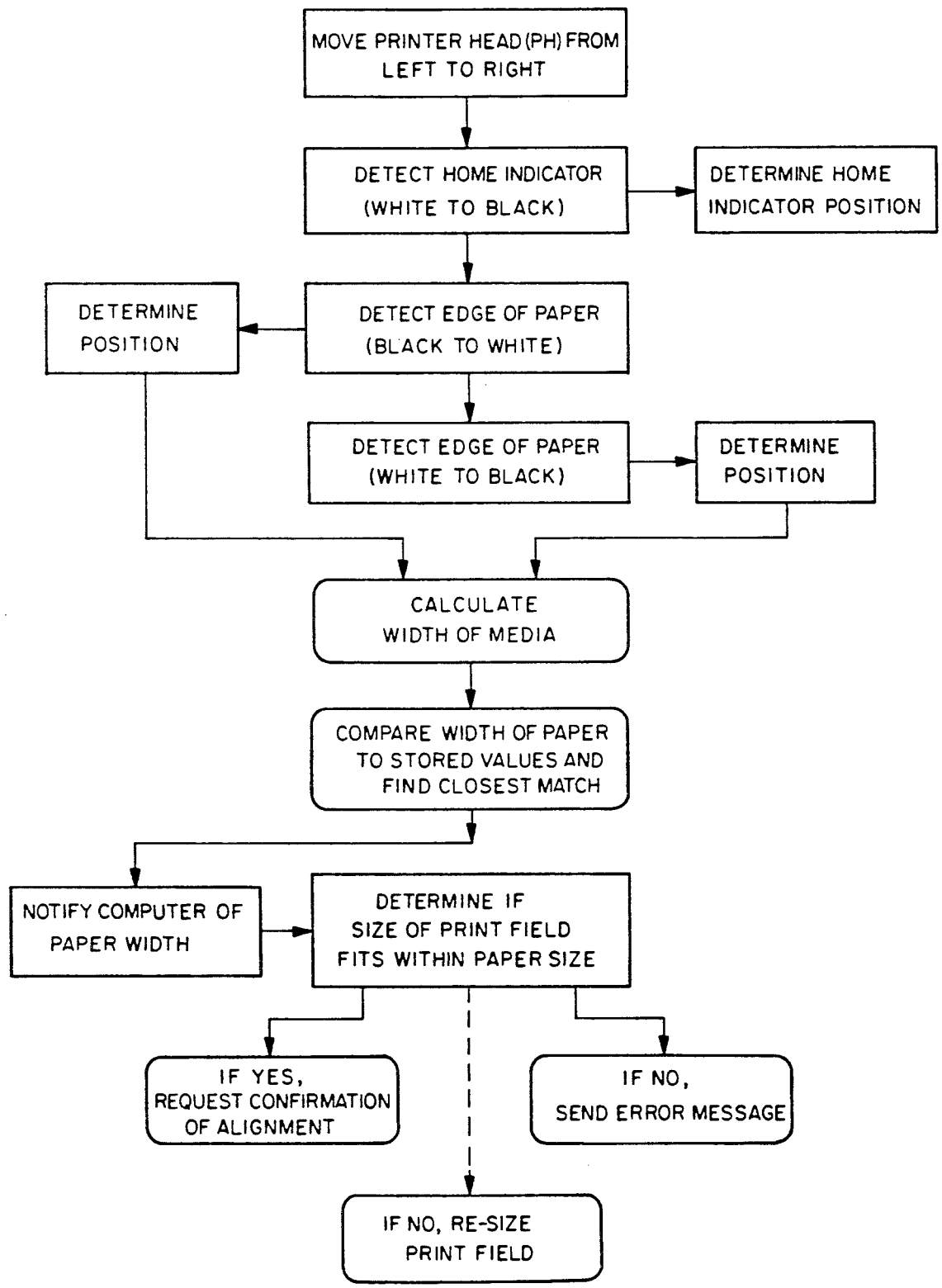

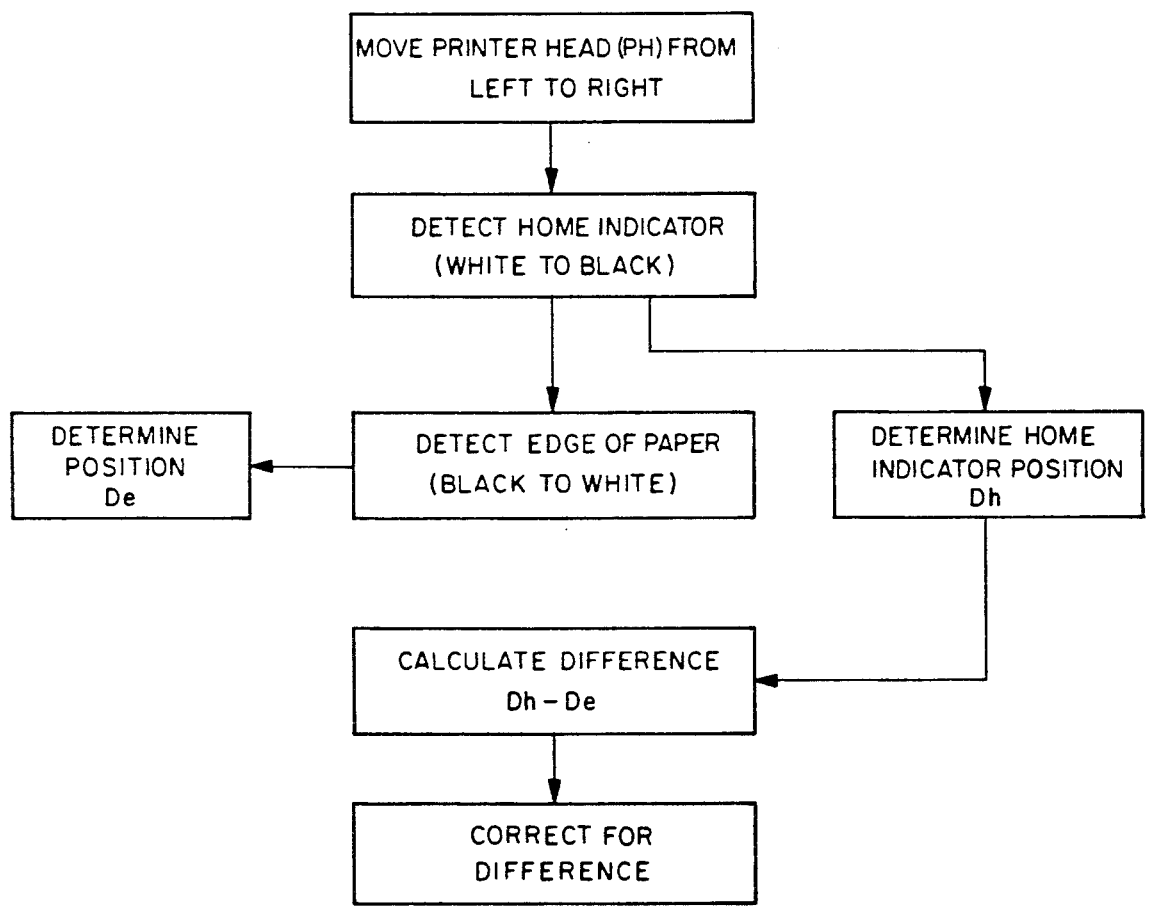
FIG _12
PRINT MEDIA BORDER CORRECTION PROTOCOL

DEVICE AND METHOD OF REGISTERING IMAGE RELATIVE TO BORDER OF PRINTED MEDIA

BACKGROUND OF THE INVENTION

1. Field of the Invention

The present invention relates to printer systems, and more particularly, to an improved printer system having an optical sensor device for detecting improper alignment of print on print media and permitting correction thereof.

2. Art Background

Printer systems, such as manual feed ink jet printers, require for their successful operation that the paper be inserted therein and aligned with a guide member, and that the edges of the paper are uniformly straight. Specifically, the printer assumes that the paper is in a particular position and orientation (that is, perfectly aligned with a guide member). If the paper is not correctly and properly aligned when inserted or its alignment slips during the printing operation, the side margins produced thereby are slanted, providing an undesirable and somewhat triangular appearance of the print on the paper. Moreover, if the paper is sufficiently slanted, and/or one or both of the side margins are sufficiently close to the edges of the paper, it is possible that the print may run off the edge of the paper. Further in this regard, with the increased use of printers for producing graphics, it has become increasingly important to be able to print such graphics as close to the edge of the paper as possible with a minimal margin. However, the smaller the margin is, the more obvious any slant or skew in the margin becomes. Accordingly, it is desirable to print on a print media such that the side margin remains substantially equidistant from the edge of the paper along its length.

Many ink jet printers print while moving in both directions, that is, backward and forward across the paper. It is thus important for the printer to be able to line up text and graphics so that it is printed in the desired position on the paper independent of the direction of movement of the print head. Presently, when an ink jet print head is calibrated to make such proper alignment, a trained technician monitors the movement of the print head backward and forward across the print media, and then manually adjusts the print head moving means to compensate for any inaccuracies. Several inaccuracies are taken into account in this process, including system backlash from the gearing in the stepper motor system which drives the print head, the stretching of the belt of the print head drive system, and mechanical stress of the support members which support the belts and pulleys of the drive system. Generally prior to shipment, or immediately upon installation, a technician calibrates the ink jet printer by detecting what the printer believes is the center of a line in both forward and backward movement of the print head and then by manipulation of dip switches which control the movement of the print head, adjusts the alignment of the movement of the print head so that the center position of the print head is properly aligned for both forward and backward movement thereof.

It has also been found that, particularly with respect to ink jet printers, that as the printer wears, there is increased flexure of the support members which support the print head and increased stretching of the belt which moves the print head. As a result, the printer head believes it is in a particular position, but in fact, it is displaced by the amount of flexure in the support members.

Thus, there are several drawbacks to this type of printer system. First, the dip switches are required, adding cost and complexity to the manufacture of the printer. Second, the manual calibration of the printer requires time and the input of a skilled technician, and the accuracy of the calibration is dependent upon the skill of the technician. Third, as the printer ages over time, the stretch of the drive belt and the flexure of the mechanical support members changes, and in particular, the stretch and flexure increases. As a result, the alignment of the print from the print head travelling in opposite directions changes, causing misalignment and less than desirable image quality. Consequently it is necessary to recalibrate the printer over time as the calibration drifts.

There are two general types of drive head movement control systems which are presently employed. The first is a timing based control system which measures the time a print head is moving in a particular direction, and then, knowing the speed of the print head and the beginning point of the movement from either side of the page, the system determines the location of the print head. The second type of print head movement control system relies upon a magnetically encoded or optical position detection means which indicates the position of the print head relative to the print carriage.

Some printers, particularly those which treat the printing of text as printing graphics, are capable of printing horizontally or vertically on paper, merely by selecting the proper orientation of the paper in the printer. Thus for example, such a system can properly print an address on an envelope independent of whether the envelope is vertically or horizontally disposed in the printer. However, there is also no prior art system for detection of alignment of paper in a printer, such that the printer can automatically determine whether the envelope is horizontal or vertical in the printer. Also, provided that the dimensions of a piece of paper installed in the printer are known by the system, there is no prior art system for determining its orientation so that the proper orientation of the print can be determined.

Prior art serial type printers presently have incorporated therein a photoelectric sensor disposed on the print head to detect the home position of the carriage. However, such photoelectric sensors are not currently used in this type of printer to detect any information relative to the positioning and alignment of paper or other print media disposed in the printer. Thus the present invention seeks to overcome this and other disadvantages of the prior art serial printer systems.

SUMMARY OF THE INVENTION

The present invention comprises an optical sensor detection system for a serial printer useful for the alignment of images on a sheet of print media, the correction of misalignment as a result of wear or inaccurate calibration of the printer and the determination of the orientation of paper or other print media in a printer.

The present invention comprises a photoelectric sensor mounted on the carriage of a serial type printer to locate the edges of the print media, such as paper. A home position relative to the printer carriage is first sensed and its position or clock time is noted. Then the first edge of the paper is sensed and its position or clock time is noted. To determine whether the paper is correctly aligned, or to make any correction in alignment, as the position of the edge of the paper is detected for each line feed, or after several line feeds, and the distance between the line edge of the paper and the home position is determined for each such line feed or detection, and a comparison is made therebetween. If the comparison shows that there is a distance of at least a certain predetermined amount, a correction is made to the printer head alignment to begin printing at a new margin position which is closer to equally spaced from the edge of the paper. The sensor is disposed adjacent the paper and a platen having a home marking is provided near the sensor as well. The sensor is designed to detect the home marking and the edge of the paper as well.

In another embodiment of the present invention, the photosensor described above can determine the size of the paper width in the printer by detecting the left edge and the right edge, determining the position of each edge relative to the carriage or an actual distance encoded relative to the carriage or may be calculated by measuring the time it takes the sensor to pass the first and second edge. In this way, the printer can determine the whether the paper is longwise or widthwise disposed in the printer and can then allow the user to determine whether to rotate the print image 90° to print on the page in the desired alignment. To accomplish this embodiment, the sensor is aligned adjacent the paper and a black or otherwise contrary color indicator is provided on a platen adjacent the paper, which would be covered if the paper is present. The sensor is designed to detect the transition between the black indicator and the white paper, for example. At each edge of the paper, the sensor detects the transition to from the white paper to black and notes that position. From this information, the printer controller can determine the size of the paper and even whether the image on the paper will fit the paper in its configuration. Additionally, from this information it is possible for the printer, in conjunction with the word processor to scale down the print size so that it does fit on the paper as configured in the printer.

In yet another embodiment of the present invention, the sensor determines the alignment or misalignment of the print head in the middle of the carriage, which reflects degradation of the system, such as stretched belts, and increased flexure of the support members. The system also corrects for any misalignment errors. In operation the system detects the position of a midpoint indicator and compares it to the assumed position of the print head based upon the time of travel or encoded position indicators as discussed above, that is, the predicted position of the sensor assuming no flex in the support members of the print head and no stretch of the belt driving the print head. The difference between the actual position and the anticipated position is then used to calculate a correction factor to the anticipated position calculation so that the anticipated position is corrected to be the same as the actual position at a predetermined position on the carriage.

It is an object of the present invention to provide a printer control system which ensures a straight margin on a print media.

It is another object of the present invention to provide a printer control system which enables the printer to print on print media and have a very small and exact margin.

It is another object of the present invention to provide a printer control system which determines the size of the print media on which the printer will be printing.

It is yet another object of the present invention to utilize a photosensor for a variety of purposes for printing accurate and high quality pictures and text.

It is another object of the present invention to provide a printer control system which self-corrects inaccuracies and other alignment problems associated with a serial type ink jet printer.

It is yet another object of the present invention to provide a printer control system which adjusts the alignment of the printer in forward and backward printing movements.

It is another object of the present invention to correct the alignment of left and right margins on a piece of print media so that the margins remain substantially equidistant from the edges of the page, independent of the misalignment of the paper in a serial type printer.

It is yet another object of the present invention to provide an alignment and calibration system for a serial type printer so that there is no longer an absolute need for dip switches for calibration of the printer head positioning.

The advantages of the method and apparatus of the present invention will be understood with reference to the drawings described briefly below and the detailed description thereof following thereafter.

BRIEF DESCRIPTION OF THE DRAWINGS

FIG. 1 is an illustration of the present invention comprising a photosensor disposed on the print head in a position to detect the presence of paper and the home position.

FIG. 2 is a diagramatic illustration of a corrected image on a sheet of paper using the subject invention.

FIG. 3 is an illustration of an envelope showing how the present invention can detect orientation of the envelope.

FIGS. 4a, 4b and 4c illustrate the correction protocol for the present invention. FIG. 4a shows an uncorrected image; FIG. 4b shows a corrected image that is corrected every several dots; FIG. 4c shows an corrected image that is corrected every dot.

FIG. 5 is an illustrative view of the present invention showing one embodiment of the dark platen.

FIG. 6 is an illustrative view of the present invention detecting the edge of a piece of paper.

FIG. 7 is an illustrative view of the present invention showing the another embodiment of the dark platen.

FIG. 8 is an illustrative view of the present invention showing an envelope disposed in the printer in a horizontal orientation.

FIG. 9 is an illustrative view of the present invention showing the another embodiment of the dark platen.

FIG. 10 is an illustrative view of the present invention showing an envelope disposed in the printer in a vertical orientation.

FIG. 11 is a flow chart illustration of one embodiment of the present invention.

FIG. 12 is a flow chart illustration of one embodiment of the present invention.

DETAILED DESCRIPTION OF THE INVENTION

The present invention comprises a system for the detection of alignment of paper in a printer, correction of alignment of margins, determination of paper width and orientation, and related functions which may be achieved by the use of the subject invention. The present invention comprises the apparatus and method for achieving the foregoing functions in accordance with the detailed description thereof presented herein.

The present invention comprises a photosensor disposed on a printer head for the detection of light reflected off of a platen or a piece of paper depending upon the particular function or operation to be achieved. As shown in FIG. 1, the invention comprises an optical sensor 10 disposed in a sensor housing 12 and positioned adjacent the platen 14. The platen 14 has a light area 15 and a dark area 16 and optionally has another light area 18. The dark area 16 can be continuous as in FIG. 1 in which it extends inclusive of areas 16a and 16b past both margins 21 and 22 of paper 20. In operation, the printer head 23 moves side to side as depicted by the arrows, along bar 24.

FIG. 2 shows a corrected image in accordance with the present invention. An uncorrected image would be skewed on the page, whereas a corrected image is equidistant from the edge of the page and the margins thereof are constant. Thus, as shown, while a straight page may have sides as shown in ghost lines 28 or 29 the corrected image 30 has margins 31 and 32 which are predominantly square with the actual edges 33 and 34 respectively of the skewed page.

As shown in FIG. 4, which is an enlarged "dot" picture of the various embodiments of the present invention, the problems of the prior art, and the various correction protocols of the present invention are depicted. The dark dots represent the dots made by the printer, with the white dots representing a non-printing dot. The dots as shown, are indicative of dots or lines for each pass of the print head. In FIG. 4A, there is no correction protocol, and the dots converge towards the margin 38. If the convergence of FIG. 4A continues through an entire page, the printing may end up off the end of the print media. In FIG. 4B which depicts a simple correction scheme, the correction protocol checks the spacing of the border 39 relative to an index marker every 4 dots, and corrects displacement every 4 dots, as necessary. The correction is accomplished by adding a small time delay to the print, wherein the time delay is proportional to the skew rate of the print media. The allowable time delay must be relatively small so that the jaggies are not observable. The maximum correction should generally be limited to 0.15% of the width of a dot, provided that the lines are single spaced. However, if the lines are double spaced the maximum correction may be greater since the jaggies would be less apparent. This maximum correction is referred to herein as a correction unit. In FIG. 4C, the correction protocol checks the spacing for every dot, and corrects when necessary. Thus, for both FIGS. 4B and 4C the margins are generally straight and uniform, although with FIG. 4B the appearance would be slightly jagged.

Generally, the skew rate is assumed to be fairly linear, and therefore, it is not necessary to obtain edge data at every pass of the print head. If the printer were to seek information on each pass it would substantially slow down the print speed in order to perform the necessary calculations and make the necessary adjustments. Accordingly the protocol of the present invention only seeks edge data frequently (every 1-2 inches) when printing gets close to the edge (within 0.5 inches or less). Otherwise edge data is sought only every 3 inches of print media advance.

The photosensor 10 as used in the present invention is a standard infrared sensor as is available from Sharp Photoelectronics, or many other commercial suppliers, and is typically used in photocopiers and printers to determine if paper is present in a particular location. The photosensor is designed to provide a signal indicating light, such as paper, or light areas of a platen, and dark, such as dark areas of a platen. The photosensor in combination with the printer system can also detect small areas of color transition, such as hash marks on a light background.

In one embodiment, the present invention is designed to detect the distance between a predetermined position on the platen and the beginning of the edge of the paper. As shown in FIG. 1, the invention would first detect the beginning 17 of the dark area 16a on the platen 14 and note its position $D_m$, referred to herein as the home position, either with a clock time or with an encoded position, as is known in the art. The sensor would then locate the edge 21 of the paper 20 and its position De would be noted. A means for determining distance such as with a microprocessor and RAM storage known in the art can be used to accomplish the foregoing. The distance $D_0$ between the edge of the paper and home position is then calculated. This calculation is performed for each line feed, or for a predetermined interval, such as every three line feeds. The distance $D_n$ is then compared with the prior distance, so that for example $D_1$ is compared with $D_0$. If there is a difference of at least one unit of correction $D_c$ (which distance is dependent upon the printer) then the correction routine is enabled. If there is no substantial difference, the line is printed without correction. If the difference is greater than 1 correction unit, the line is corrected only 1 correction unit so that there is not a substantial difference between adjacent lines which would provide a jagged appearance. A means for adjusting such as a stepping motor adapted to the print head can be used to implement the corrections. Further, in connection with the above means for determining distance, the stepper motor counts can be used to determine position, as is known in the art. Also, if the velocity and elapsed time of motion of the stepper motor are known, it is again possible to determine the position thereof. The excess above the correction unit is added to the following line calculation.

If $D_c \geq |D_{n+1} - D_n| = 0$ then no correction

If $|D_{n+1} - D_n| = D_c$ then, correction of $D_c$

If $|D_{n+1} - D_n| > D_c$ then, correction of $D_c$ and $|D_{n+2} - D_n - D_c|$ is the next line calculation.

In a more sophisticated embodiment, the distance $D_n$ is subjected to a regression analysis in order to ensure continuity and eliminate the effects of extraneous determinations in favor of continuity. For example, paper edge raggedness, sensor sensitivities to reflectance, and digital sampling of the sensor, may all cause errors, which in turn, may throw the calculation of $D_n$ far off which in turn, will cause the printer to print one line far from the margin. To alleviate the risk of such occurrence, a running tabulation is kept of the regression, and a best fit line is calculated for the distance of any correction in accordance with the following equations:

$$A = \frac{n\Sigma xy - \Sigma x \Sigma y}{n\Sigma x^2 - (\Sigma x)^2}$$

$$B = \frac{\Sigma y \Sigma x^2 - \Sigma x \Sigma xy}{n\Sigma x^2 - (\Sigma x)^2}$$

where x is $D_n$, y is the line distance information (i.e. the number of lines advanced per calculation or the distance of the line feed), A is the slope and B is the y intercept. To perform the preceding functions, the present invention provides a means for calculating said distance and a means for determining the best line fit based on the regression analysis; as is known in the art, a microprocessor can be easily programmed to perform these functions. The slope A will be the angle of the slant of the paper, and the distance of change of x for a given number of line feeds may be determined, and then corrected. The present invention provides a means for determining the orientation of said print media based on the slant of the paper and the distance of change of X for a given number of line feeds; in the preferred embodiment, this can be performed by a microprocessor programmed to recognize the slope as a slant in the paper or print media. This data can then be transferred to a printing computer through a means for notifying such as a data bus, known in the art.

In an alternative embodiment, the present invention can determine the width of paper for printing and provide that information to the computer to either scale down the print image, determine the direction of print such as for envelopes, and/or provide the scale information to the user for further instructions. The foregoing can be performed by a means for mapping the print image on the print media, then determining if the print image will fit on the print media, and then scaling the print image to fit on the print media. The foregoing can be performed by a properly programmed microprocessor, known in the art. As illustrated in FIG. 3, depending upon the direction of the envelope, whether it is vertically or horizontally disposed in the printer, the printer may print in the appropriate direction without removing and realigning the envelope.

As shown in FIGS. 5-10, various embodiments of the present invention, and various applications of those embodiments are shown. FIG. 5 shows the present invention including a first white to black transition comprising a home position indicator means 55, a black region 52 of the platen, a white region 53 and a sensor 51 mounted on or associated with a print head 50. FIG. 6 showns the same arrangement with a piece of paper 54 therein. The sensor 51 would be able to detect the edge of the paper against the black platen 52. FIG. 7 illustrates another embodiment which also includes a second black region 58 sufficiently displaced from the first black region 52 so that paper of any size and orientation would terminate in the second black region 58. An important aspect of this invention is that the dark regions are disposed wherever it is expected that the paper will typically have an edge in any orientation so that a transition between dark and light can be detected. The present invention provides a means for determining a second transition and a means for determining the distance between the first end and the second end of said print media to perform the foregoing functions. In the preferred embodiment, a microprocessor with a light discrimination circuit known in the art can be programmed to determine the second transition or to calculate the distance between the first end and the second end.

FIG. 9 shows another embodiment in which the black region 57 extends substantially across the entire platen, with the exception of a small white region to provide the transition for the home position 55. FIGS. 8 and 10 show envelopes disposed in a printer such as is shown in FIGS. 7 and 9, with the envelope being in two separate orientations. In FIG. 8 the envelope 60 is disposed horizontally in the printer so that the black region 58 is relatively small. Conversely, in FIG. 10, the envelope 60a is vertically disposed in the printer so that the second black region 58a is larger, and consequently, the sensor will detect the beginning and ending points of the envelope to know where to start and stop the printing. The printer will also be able to compare the measured dimensions with a lookup table, identify the measured width of the envelope as being a vertically disposed envelope, and rotate the printing image 90° so that the address information is correctly printed thereon.

It will be obvious to a person of ordinary skill in the art that many changes and modifications can be made to the abovedescribed systems which will fall within the spirit and scope of the invention as set forth in the appended claims.

What is claimed is:

1. A printer system having a print head, a platen having first and second ends and a means for moving said print head relative to said platen, print media disposed on said platen between said first and second ends, said printer system comprising:
   a light sensor means associated with said print head for detecting transition from light to dark on and near said platen;
   a light region and a dark region disposed on said platen, wherein said dark region on said platen is spaced from the first end of said platen by said light region to provide a light to dark transition;
   a first position located at least beyond said print media near said second end of said platen;
   a home position indicator means disposed at said light to dark transition near said first end of said platen;
   means for determining the distance between said home position and said first position; and
   means for adjusting the print position of said print head in response to said distance.

2. The printer system of claim 1 wherein said dark region extends to said second end of said platen.

3. The printer system of claim 1 further comprising a second dark region on said platen extending from said second end toward said first end, but not extending to said first dark region.

4. The printer system of claim 1 wherein said means for determining said distance comprises:
   means for calculating said distance at regular intervals along the length of the print media, and
   means for determining the best line fit of said distance along said length.

5. The printer system of claim 1 further comprising:
   a second dark region extending from said second end of said platen toward said first end;
   means for determining a second transition from light to dark indicating the second end of said print media; and means for determining the distance between said first end and said second end of said print media.

6. The printer system of claim 5 further comprising:
means for determining the orientation of said print media;
a printing computer; and
means for notifying said printing computer to map a print image dependent upon said orientation.

7. The printer system of claim 5 further comprising:
means for mapping a print image on said print media;
means for determining if said print image will fit on said print media; and
means for scaling said print image to fit on said print media.

8. A method for registering printed media disposed in a platen including a print head movable between a light to dark region and a dark to light region which are detectable by a photosensor, comprising the steps of providing a dark region on the platen spaced from the first end of said platen by a light region:
detecting a first transition from said light to dark region;
designating the first transition as a home position;
detecting a second transition from said dark region to said printed media;
designating the second transition as a first position;
determining a distance between said home position and said first position; and
adjusting a print position of said print head in response to said distance.

9. A method for registering print media according to claim 8, wherein the method further comprises recalculating the distance by regression analysis.

* * * * *